UNITED STATES PATENT OFFICE.

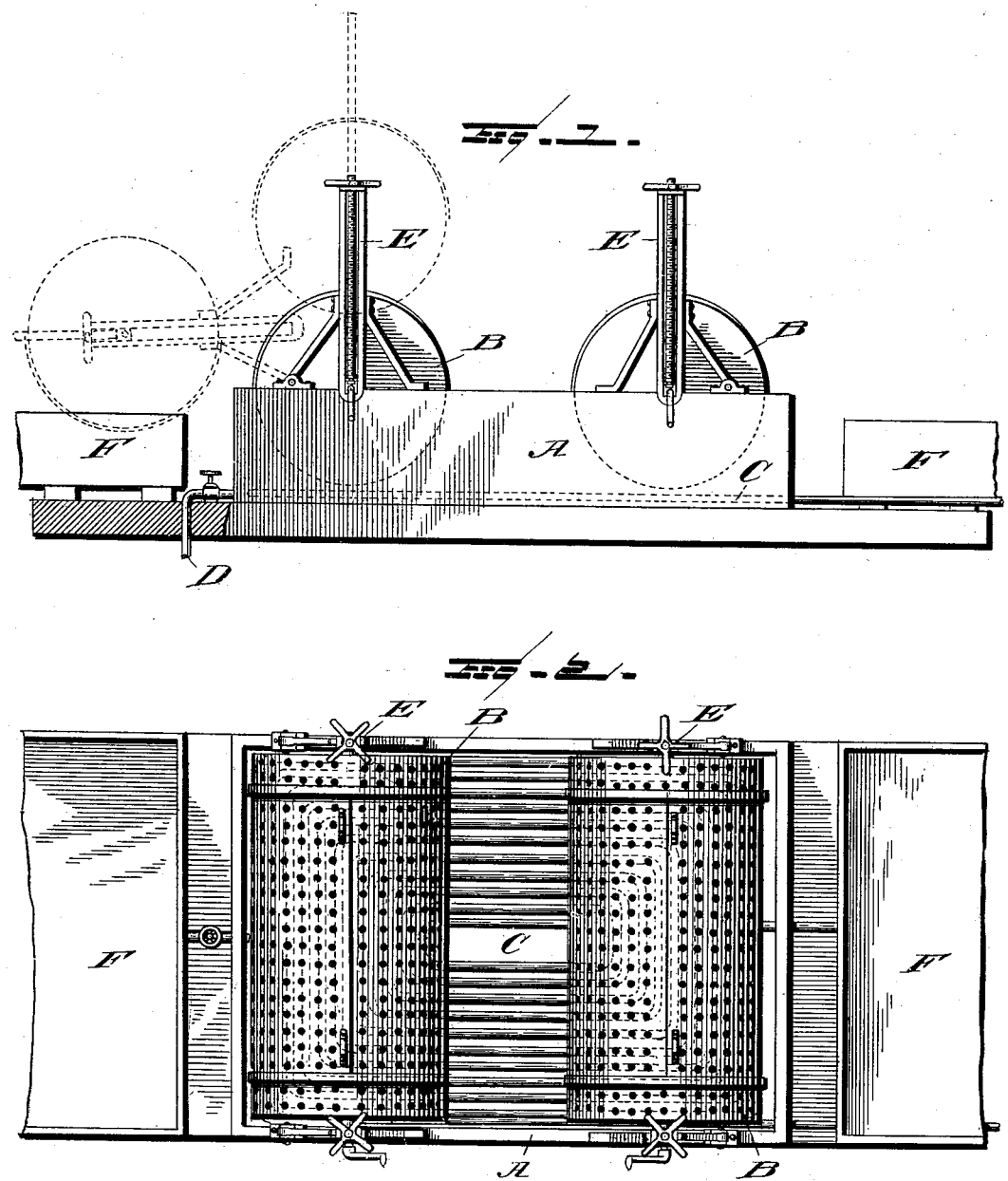

EDWARD B. CUNNINGHAM AND FELIX C. THIELE, OF SUGARLAND, TEXAS.

PROCESS OF DELINTING COTTON-SEED.

SPECIFICATION forming part of Letters Patent No. 637,089, dated November 14, 1899.

Application filed June 17, 1899. Serial No. 720,908. (No specimens.)

*To all whom it may concern:*

Be it known that we, EDWARD B. CUNNINGHAM and FELIX C. THIELE, citizens of the United States, residing at Sugarland, in the county of Fort Bend, State of Texas, have invented certain new and useful Improvements in Processes of Delinting Cotton-Seed, of which the following is a specification.

This invention relates to a process of delinting cotton-seed, and particularly to a method of treating said seed whereby the germ within the seed is not injured and the cellulose or lint when removed will be in such a shape as to be useful in the production of other commercial products and the oil within the seed retained in an unimpaired condition.

The invention has for its object to improve the process or method heretofore used in the treatment of cotton-seed with sulfuric acid for the purpose of delinting. The treatment of the seed with the acid is carried out at a temperature not exceeding 40° Fahrenheit, a dehydrator having been previously mixed with the acid or dissolved in it. The cellulose enters into solution, while the seed remains unaltered and may be removed from the solution in a clean condition suitable for the extraction of oil or for germination.

Other objects and advantages of the invention will hereinafter appear in the following description, and the novel features thereof will be particularly pointed out in the appended claims.

The process hereinbefore referred to consists in subjecting the cotton-seed to be delinted to a treatment or bath of sulfuric acid having a specific gravity of not less than 1.568 or not more than 1.842, at a temperature not exceeding 40° Fahrenheit, the acid being previously mixed with a dehydrator, such as pyrosulfuric acid or its salts, or passing the electric current (which acts as a dehydrator) through the bath during the operation.

The sulfuric acid above referred to is the acid $H_2S_2O_7$, which crystallizes from fuming sulfuric acid on cooling the latter to about 35° to 40° Fahrenheit and is 66° Baumé.

If an electric current be passed through the dehydrating-bath, it concentrates dilute sulfuric acid by decomposition of the water, the acid is strengthened, and a more powerful dissolving action upon the cellulose results therefrom.

In order to successfully accomplish the objects of this invention and prevent injury to the seed, it is highly essential that the temperature should not exceed 40° Fahrenheit, and with this object in view the acid mixture may be maintained at that temperature by any suitable cooling or refrigerating agency—for instance, by coils through which cold salt brine circulates, an ice packing, &c. In order to save in cooling material, the operation may be carried out in a vacuum, which also prevents the destruction of any product formed from the cellulose during the process. The specific gravity of the acid used in the treatment may be acquired in any desired manner—for instance, by the addition of ordinary commercial "oil of vitriol" to water, or evaporating the ordinary "chamber-acid" to the desired density. At this stage of the process the cellulose from the seed is rapidly dissolved by the acid mixture and the seed itself is removed from the solution by means of any mechanical devices.

The treatment of the seed with the above acid mixture at the low temperature mentioned protects the germ within the seed and also the oil therein, so that after the removal of the seed from the solution it is suitably washed and dried, when it is in condition for any future use or treatment. The remaining solution contains the cellulose removed from the delinted seed in a form which allows its transformation into a useful product. As this forms the subject-matter of another application filed herewith, no description of said product is required here. An advantage is secured because the delinting process above set forth does not injure or carbonize the cellulose removed from the seed, but changes it into compounds useful in the arts.

It is obvious that any suitable mechanical device may be employed for performing the hereinbefore-described steps of this process or any equivalent steps; but in the accompanying drawings a simple apparatus for effecting the result is illustrated.

In this illustration, Figure 1 represents a side elevation, and Fig. 2 a top view, of an apparatus, in which the letter A designates a trough of suitable material and sufficient size to hold the acid mixture. B B are revolving perforated cylinders, which hold the crude seed and are vertically movable upon the post E to remove the seed from the acid and permit the same to be withdrawn, and the cylinders are adapted to be moved for the purpose of depositing the seed in suitable washing-tanks F. In the bottom of the tank A a cooling-coil C is arranged, through which a suitable cooling agent passes to maintain the acid mixture at the necessary low temperature, and this mixture may be drawn off from the tank when exhausted by means of the draw-off valve D.

Having described our invention, what we claim as new, and desire to secure by Letters Patent, is—

1. The process of delinting cotton-seed consisting of a treatment thereof with a mixture of sulfuric acid and a dehydrator, the sulfuric acid having a specific gravity not less than 1.568 and not more than 1.842, and at a temperature not exceeding 40° Fahrenheit; substantially as specified.

2. The process of delinting cotton-seed consisting of a treatment thereof with a mixture of sulfuric acid and a dehydrator, the sulfuric acid having a specific gravity not less than 1.568 and not more than 1.842, and at a temperature not exceeding 40° Fahrenheit and removing, washing and drying the delinted seed; substantially as specified.

In testimony whereof we affix our signatures in presence of two witnesses.

EDWARD B. CUNNINGHAM.
FELIX C. THIELE.

Witnesses:
FRANK J. BREELEN,
JNO. B. KETTERSON.